(12) United States Patent
Kamperman

(10) Patent No.: US 10,091,186 B2
(45) Date of Patent: *Oct. 2, 2018

(54) SECURE AUTHENTICATED DISTANCE MEASUREMENT

(71) Applicant: KONINKLIJKE PHILIPS N.V., Eindhoven (NL)

(72) Inventor: Franciscus L. A. J. Kamperman, Geldrop (NL)

(73) Assignee: Koninklijke Philips N.V., Eindhoven (NL)

(*) Notice: Subject to any disclaimer, the term of this patent is extended or adjusted under 35 U.S.C. 154(b) by 72 days.

This patent is subject to a terminal disclaimer.

(21) Appl. No.: 15/352,646

(22) Filed: Nov. 16, 2016

(65) Prior Publication Data

US 2017/0063556 A1 Mar. 2, 2017

Related U.S. Application Data

(63) Continuation of application No. 15/229,207, filed on Aug. 5, 2016, now Pat. No. 9,590,977, which is a (Continued)

(30) Foreign Application Priority Data

Jul. 26, 2002 (EP) ..................................... 02078076

(51) Int. Cl.
*H04L 29/06* (2006.01)
*H04L 9/14* (2006.01)
(Continued)

(52) U.S. Cl.
CPC .......... *H04L 63/0823* (2013.01); *G06F 21/10* (2013.01); *H04L 9/14* (2013.01);
(Continued)

(58) Field of Classification Search
CPC .......... H04L 63/0823; H04L 9/14; H04L 9/30; H04L 9/3263; H04L 63/062; H04L 43/16;
(Continued)

(56) References Cited

U.S. PATENT DOCUMENTS 4,438,824 A 3/1984 Mueller-Scholoer
4,688,036 A 8/1987 Hirano et al.
(Continued)

FOREIGN PATENT DOCUMENTS

EP 1100035 A1 5/2001
JP H04306760 A 10/1992
(Continued)

OTHER PUBLICATIONS

Ikeno et al "Modern Cryptography Theory" Japan, Institute of Electronics, Information and Communication Engineers, Nov. 15, 1997, p. 175-177.
(Continued)

*Primary Examiner* — Darren B Schwartz

(57) ABSTRACT

The invention relates to a method for a first communication device to perform authenticated distance measurement between the first communication device and a second communication device, wherein the first and the second communication device share a common secret and the common secret is used for performing the distance measurement between the first and the second communication device. The invention also relates to a method of determining whether data stored on a first communication device are to be accessed by a second communication device. Moreover, the invention relates to a communication device for performing authenticated distance measurement to a second communication device. The invention also relates to an apparatus for playing back multimedia content comprising a communication device.

36 Claims, 3 Drawing Sheets

Related U.S. Application Data continuation of application No. 14/538,493, filed on Nov. 11, 2014, now Pat. No. 9,436,809, which is a continuation of application No. 10/521,858, filed as application No. PCT/IB03/02932 on Jun. 27, 2003, now Pat. No. 8,886,939.

(51) Int. Cl.

| | |
|---|---|
| *H04L 9/30* | (2006.01) |
| *H04L 9/32* | (2006.01) |
| *H04L 12/26* | (2006.01) |
| *G06F 21/10* | (2013.01) |
| *H04W 24/00* | (2009.01) |
| *H04W 12/06* | (2009.01) |

(52) U.S. Cl.
CPC .............. *H04L 9/30* (2013.01); *H04L 9/3263* (2013.01); *H04L 43/0852* (2013.01); *H04L 43/16* (2013.01); *H04L 63/062* (2013.01); *H04L 63/107* (2013.01); *G06F 2221/07* (2013.01); *G06F 2221/2111* (2013.01); *H04L 63/0428* (2013.01); *H04L 2463/101* (2013.01); *H04W 12/06* (2013.01); *H04W 24/00* (2013.01)

(58) Field of Classification Search
CPC ............... H04L 43/0852; H04L 63/107; H04L 63/0428; H04L 2463/101; G06F 21/10; G06F 2221/07; G06F 2221/2111; H04W 24/00; H04W 12/06
See application file for complete search history.

(56) References Cited

U.S. PATENT DOCUMENTS

| | | | |
|---|---|---|---|
| 4,926,480 A | | 5/1990 | Chaum |
| 5,126,746 A | | 6/1992 | Gritton |
| 5,351,293 A | * | 9/1994 | Michener .............. H04L 9/0822 380/44 |
| 5,596,641 A | | 1/1997 | Ohashi et al. |
| 5,602,917 A | | 2/1997 | Mueller |
| 5,659,617 A | | 8/1997 | Fischer |
| 5,708,712 A | * | 1/1998 | Brinkmeyer ............ B60R 25/04 340/5.25 |
| 5,723,911 A | | 3/1998 | Glehr |
| 5,778,071 A | | 7/1998 | Caputo et al. |
| 5,937,065 A | | 8/1999 | Simon et al. |
| 5,949,877 A | * | 9/1999 | Traw ........................ G06F 21/10 380/30 |
| 5,983,347 A | | 11/1999 | Brinkmeyer et al. |
| 6,085,320 A | | 7/2000 | Kaliski |
| 6,088,450 A | | 7/2000 | Davis et al. |
| 6,148,404 A | * | 11/2000 | Yatsukawa ............ G06F 21/335 380/30 |
| 6,151,676 A | | 11/2000 | Cuccia et al. |
| 6,208,239 B1 | | 3/2001 | Muller et al. |
| 6,346,878 B1 | | 2/2002 | Pohlman et al. |
| 6,351,235 B1 | | 2/2002 | Stilp |
| 6,442,690 B1 | | 8/2002 | Howard, Jr. |
| 6,484,948 B1 | | 11/2002 | Sonoda |
| 6,493,825 B1 | | 12/2002 | Blumenau et al. |
| 6,526,598 B1 | | 3/2003 | Horn |
| 6,550,011 B1 | | 4/2003 | Sims |
| 7,200,233 B1 | | 4/2007 | Keller et al. |
| 7,242,766 B1 | | 7/2007 | Lyle |
| 7,516,325 B2 | | 4/2009 | Willey |
| 7,685,423 B1 | * | 3/2010 | Walmsley ................ G06F 21/44 399/24 |
| 7,787,865 B2 | | 8/2010 | Willey |
| 7,898,977 B2 | | 3/2011 | Roese |
| 8,068,610 B2 | | 11/2011 | Moroney |
| 8,107,627 B2 | | 1/2012 | Epstein |
| 8,352,582 B2 | | 1/2013 | Epstein |
| 8,997,243 B2 | | 3/2015 | Epstein |
| 2001/0002486 A1 | * | 5/2001 | Kocher ................... G06F 7/723 713/171 |
| 2001/0008558 A1 | | 7/2001 | Hirafuji |
| 2001/0043702 A1 | | 11/2001 | Elteto et al. |
| 2001/0044786 A1 | | 11/2001 | Ishibashi |
| 2001/0050990 A1 | * | 12/2001 | Sudia ..................... G06Q 20/02 380/286 |
| 2002/0007452 A1 | * | 1/2002 | Traw ....................... G06F 21/10 713/152 |
| 2002/0026424 A1 | | 2/2002 | Akashi |
| 2002/0026576 A1 | | 2/2002 | Das-Purkayastha et al. |
| 2002/0035690 A1 | | 3/2002 | Nakano |
| 2002/0061748 A1 | | 5/2002 | Nakakita et al. |
| 2002/0078227 A1 | | 6/2002 | Kronenberg |
| 2002/0166047 A1 | | 11/2002 | Kawamoto |
| 2003/0021418 A1 | | 1/2003 | Arakawa et al. |
| 2003/0030542 A1 | | 2/2003 | Von Hoffmann |
| 2003/0051151 A1 | | 3/2003 | Asano |
| 2003/0065918 A1 | | 4/2003 | Willey |
| 2003/0070092 A1 | | 4/2003 | Hawkes et al. |
| 2003/0112978 A1 | | 6/2003 | Rodman et al. |
| 2003/0184431 A1 | | 10/2003 | Lundkvist |
| 2003/0220765 A1 | | 11/2003 | Overy et al. |
| 2004/0015693 A1 | | 1/2004 | Kitazumi |
| 2004/0080426 A1 | | 4/2004 | Fraenkel |
| 2005/0114647 A1 | | 5/2005 | Epstein |
| 2005/0265503 A1 | | 12/2005 | Rofheart et al. |
| 2006/0294362 A1 | | 12/2006 | Epstein |

FOREIGN PATENT DOCUMENTS

| | | |
|---|---|---|
| JP | H0619948 A | 1/1994 |
| JP | H08234658 A | 9/1996 |
| JP | 9170364 A | 6/1997 |
| JP | H09170364 A | 6/1997 |
| JP | 11101035 A | 4/1999 |
| JP | 11208419 A | 8/1999 |
| JP | 2000357156 A | 12/2000 |
| JP | 2001249899 A | 9/2001 |
| JP | 2001257672 A | 9/2001 |
| JP | 2002124960 | 4/2002 |
| JP | 2002189966 A | 7/2002 |
| WO | 9739553 A1 | 10/1997 |
| WO | 9949378 | 9/1999 |
| WO | 0152234 A1 | 7/2001 |
| WO | 0193434 A1 | 12/2001 |
| WO | 0233887 A2 | 4/2002 |
| WO | 0235036 A1 | 5/2002 |
| WO | 02054353 A1 | 7/2002 |

OTHER PUBLICATIONS

Modern Cryptography Theory (1986) Chapter 9, ISBN: 4-88552-064-9 (Japanese).

Hayashi et al Encryption and Authentication Program Module, Technical Paper (Japanese) NTT R&D vol. 44, No. 10 Oct. 1, 1995.

Stefan Brands and Devid Chaum "Distance Bounding Protocols" Eurocrypt "93, (1993) p. 344-359.

Tim Kindber & Kan Zhang "Context Authention Using Constrained Channels" pp. 1-8 , Apr. 16, 2001.

Hitachi Ltd., 5C Digital Transmission Content Protection White Paper Rev. 1.0 Jul. 14, 1998, p. 1013.

Boyd et al "Protocols for Authention and Key Establishment" Spring-Verlag, Sep. 17, 2003, p. 116-120, 195, 305.

SmartRight™ Certification for FCC Approval for Use with the Broadcast Flag, Mar. 1, 2004.

SmartRight™ Copy Protection for System for Digital Home Networks, Deployment Process, CPTWG, Nov. 28, 2001.

SmartRight™ Copy Protection System for Digital Home Networks, CPTWG, May 24, 2001.

SmartRight™ Digital Broadcast Content Protection, Presentation to FCC, Apr. 2, 2004 (cited in litigation).

SmartRight™ Technical White Paper, Version 1.7, Jan. 2003 ("White Paper") (cited in litigation).

(56) References Cited

OTHER PUBLICATIONS

Internet Security Association and Key Management Protocol (ISAKMP), Request for Comments 2408 ("RFC 2408")—cited in litigation.
International Standard ISO/IEC 11770-3 (1st ed.) ("ISO 11770-3"), 2008.
Scott Crosby, et al., "A Cryptanalysis of the High-bandwidth Digital Content Protection System" Computer and Communications Security, (2001).
SmartRight™ Specifications Sep. 26, 2001.
SmartRight™ Copy Protection System for Digital Home Networks, CPTWG, Jul. 11, 2001.
Bruce Schneier, Applied Cryptography (2d ed. 1996) ("Schneier").
Steven M. Bellovin and Michael Merritt, "Encrypted Key Exchange: Password-Based Protocols Secure Against Dictionary Attacks".
RFC 2463 Internet Control Message Protocol Dec. 1998.
RFC2246 The TLS Protocol, Jan. 1999.
Internet Security Association and Key Management Protocol (ISAKMP), Request for Comments 2408 ("RFC 2408"), 1998.
High Bandwidth Digital Content Protection System Feb. 17, 2000.
High Bandwidth Digital Content Protection System Revision 1.0 Erratum Mar. 1, 2001.
Digital Transmission Content Protection Specification vol. 1 Hitachi Ltd. Revision 1.0 Apr. 12, 1999.
Digital Transmission Content Protection Specification vol. 1 (Informational Version) Hitachi Ltd. Revision 1.2A Feb. 25, 2002.
Declaration of William Rosenblatt, Microsoft Exhibit 1009, 2018.
Supplemental Declaration of William Rosenblatt, Microsoft Exhibit 1015, 2018.
Petition for Inter Parties Review of U.S. Pat. No. 8,543,819, 2018.
Patent Owner's Preliminary Response, 2018.
Petitioners' Reply to Patent Owner's Preliminary Response, 2018.
Patent Owner's Sur-Reply to Petitioners' Reply, 2018.
Petition for Inter Parties Review of U.S. Pat. No. 9,436,809, 2018.
Markman Order Filed Jul. 11, 2017.
Internet Security Association and Key Management Protocol (ISAKMP), Request for Comments 2407 ("RFC 2407"), Nov. 1998.
Internet Security Association and Key Management Protocol (ISAKMP), Request for Comments 2409 ("RFC 2409"), Nov. 1998.

\* cited by examiner

SECURE AUTHENTICATED DISTANCE MEASUREMENT

This application is a continuation of the patent applications entitled "Secure Authenticated Distance Measurement", filed on Aug. 5, 2016 and afforded Ser. No. 15/229,207 which is a continuation of the application filed Nov. 11, 2014 and afforded Ser. No. 14/538,493 which claims priority pursuant to 35 USC 120, priority to and the benefit of the earlier filing date of, that patent application entitled "Secure Authenticated Distance Measurement", filed on Jan. 21, 2005 and afforded Ser. No. 10/521,858 (now U.S. Pat. No. 8,886,939), which claimed priority to and the benefit of the earlier filing date, as a National Stage Filing of that international patent application filed on Jun. 27, 2003 and afforded serial number PCT/IB2003/02932 (WO2004014037), which claimed priority to and the benefit of the earlier filing date of that patent application filed on Jul. 26, 2002 and afforded serial number EP 02078076.3, the contents of all of which are incorporated by reference, herein.

This application is further related to that patent application entitled "Secure authenticated Distance Measurement", filed on Jul. 24, 2009 and afforded Ser. No. 12/508,917 (now U.S. Pat. No. 8,543,819), issued Sep. 24, 2013), which claimed priority to and the benefit of the earlier filing date of that patent application entitled "Secure Authenticated Distance Measurement", filed on Jan. 21, 2005 and afforded Ser. No. 10/521,858 (now U.S. Pat. No. 8,886,939), the contents of which are incorporated by reference herein.

The invention relates to a method for a first communication device to performing authenticated distance measurement between a first communication device and a second communication device. The invention also relates to a method of determining whether data stored on a first communication device is to be accessed by a second communication device. Moreover, the invention relates to a communication device for performing authenticated distance measurement to a second communication device. The invention also relates to an apparatus for playing back multimedia content comprising a communication device.

Digital media have become popular carriers for various types of data information. Computer software and audio information, for instance, are widely available on optical compact disks (CDs) and recently also DVD has gained in distribution share. The CD and the DVD utilize a common standard for the digital recording of data, software, images, and audio. Additional media, such as recordable discs, solid-state memory, and the like, are making considerable gains in the software and data distribution market.

The substantially superior quality of the digital format as compared to the analog format renders the former substantially more prone to unauthorized copying and pirating, further a digital format is both easier and faster to copy. Copying of a digital data stream, whether compressed, uncompressed, encrypted or non-encrypted, typically does not lead to any appreciable loss of quality in the data. Digital copying thus is essentially unlimited in terms of multi-generation copying. Analog data with its signal to noise ratio loss with every sequential copy, on the other hand, is naturally limited in terms of multi-generation and mass copying.

The advent of the recent popularity in the digital format has also brought about a slew of copy protection and DRM systems and methods. These systems and methods use technologies such as encryption, watermarking and right descriptions (e.g. rules for accessing and copying data).

One way of protecting content in the form of digital data is to ensure that content will only be transferred between devices if the receiving device has been authenticated as being a compliant device, and the user of the content has the right to transfer (move, copy) that content to another device.

If transfer of content is allowed, this will typically be performed in an encrypted way to make sure that the content cannot be captured illegally in a useful format.

Technology to perform device authentication and encrypted content transfer is available and is called a secure authenticated channel (SAC). Although it might be allowed to make copies of content over a SAC, the content industry is very bullish on content distribution over the Internet. This results in disagreement of the content industry on transferring content over interfaces that match well with the Internet, e.g. Ethernet.

Further, it should be possible for a user visiting his neighbor to watch a movie, which he owns, on the neighbor's big television screen. Typically, the content owner will disallow this, but it might become acceptable if it can be proved that a license holder of that movie (or a device that the license holder owns) is near that television screen.

It is therefore of interest to be able to include an authenticated distance measurement when deciding whether content should be accessed or copied by other devices.

In the article by Stefan Brands and David Chaum, "Distance-Bounding protocols", Eurocrypt '93 (1993), Pages 344-359, integration of distance-bounding protocols with public-key identification schemes is described. Here distance measurement is described based on time measurement using challenge and response bits and with the use of a commitment protocol. This does not allow authenticated device compliancy testing and is not efficient when two devices must also authenticate each other.

It is an object of the invention to obtain a solution to the problem of performing a secure transfer of content within a limited distance.

This is obtained by a method for a first communication device to performing authenticated distance measurement between the first communication device and a second communication device, wherein the first and the second communication device share a common secret and the common secret is used for performing the distance measurement between the first and the second communication device.

Because the common secret is being used for performing the distance measurement, it can be ensured that when measuring the distance from the first communication device to the second communication device, it is the distance between the right devices that is being measured.

The method combines a distance measurement protocol with an authentication protocol. This enables authenticated device compliancy testing and is efficient, because a secure channel is anyhow needed to enable secure communication between devices and a device can first be tested on compliancy before a distance measurement is executed.

In a specific embodiment, the authenticated distance measurement is performed according to the following steps, transmitting a first signal from the first communication device to the second communication device at a first time t1, the second communication device being adapted for receiving the first signal, generating a second signal by modifying the received first signal according to the common secret and transmitting the second signal to the first device, receiving the second signal at a second time t2, checking if the second signal has been modified according to the common secret, determining the distance between the first and the second communication device according to a time difference between t1 and t2.

When measuring a distance by measuring the time difference between transmitting and receiving a signal and using a secret, shared between the first and the second communication device, for determining whether the returned signal really originated from the second communication device, the distance is measured in a secure authenticated way ensuring that the distance will not be measured to a third communication device (not knowing the secret). Using the shared secret for modifying the signal is a simple way to perform a secure authenticated distance measurement.

In a specific embodiment the first signal is a spread spectrum signal. Thereby a high resolution is obtained and it is possible to cope with bad transmission conditions (e.g. wireless environments with a lot of reflections).

In another embodiment the step of checking if the second signal has been modified according to the common secret is performed by the steps of, generating a third signal by modifying the first signal according to the common secret, comparing the third signal with the received second signal.

This method is an easy and simple way of performing the check, but it requires that both the first communication device and the second communication device know how the first signal is being modified using the common secret.

In a specific embodiment the first signal and the common secret are bit words and the second signal comprises information being generated by performing an XOR between the bit words. Thereby, it is a very simple operation that has to be performed, resulting in demand for few resources by both the first and the second communication device when performing the operation.

In an embodiment the common secret has been shared before performing the distance measurement, the sharing being performed by the steps of, performing an authentication check from the first communication device on the second communication device by checking whether the second communication device is compliant with a set of predefined compliance rules, if the second communication device is compliant, sharing the common secret by transmitting the secret to the second communication device.

This is a secure way of performing the sharing of the secret, ensuring that only devices being compliant with compliance rules can receive the secret. Further, the shared secret can afterwards be used for generating a SAC channel between the two devices. The secret could be shared using e.g. key transport mechanisms as described in ISO 11770-3. Alternatively, a key agreement protocol could be used, which e.g. is also described in ISO 11770-3.

In another embodiment the authentication check further comprises checking if the identification of the second device is compliant with an expected identification. Thereby, it is ensured that the second device really is the device that it should be. The identity could be obtained by checking a certificate stored in the second device.

The invention also relates to a method of determining whether data stored on a first communication device are to be accessed by a second communication device, the method comprising the step of performing a distance measurement between the first and the second communication device and checking whether the measured distance is within a predefined distance interval, wherein the distance measurement is an authenticated distance measurement according to the above. By using the authenticated distance measurement in connection with sharing data between devices, unauthorized distribution of content can be reduced.

In a specific embodiment the data stored on the first device is sent to the second device if it is determined that the data stored on the first device are to be accessed by the second device.

The invention also relates to a method of determining whether data stored on a first communication device are to be accessed by a second communication device, the method comprising the step of performing a distance measurement between a third communication device and the second communication device and checking whether the measured distance is within a predefined distance interval, wherein the distance measurement is an authenticated distance measurement according to the above. In this embodiment, the distance is not measured between the first communication device, on which the data are stored, and the second communication device. Instead, the distance is measured between a third communication device and the second communication device, where the third communication device could be personal to the owner of the content.

The invention also relates to a communication device for performing authenticated distance measurement to a second communication device, where the communication device shares a common secret with the second communication device and where the communication device comprises means for measuring the distance to the second device using the common secret.

In an embodiment the device comprises:

means for transmitting a first signal to a second communication device at a first time t1, the second communication device being adapted for receiving the first signal, generating a second signal by modifying the received first signal according to the common secret and transmitting the second signal, means for receiving the second signal at a second time t2, means for checking if the second signal has been modified according to the common secret, and means for determining the distance between the first and the second communication device according to a time difference between t1 and t2.

The invention also relates to an apparatus for playing back multimedia content comprising a communication device according to the above.

In the following preferred embodiments of the invention will be described referring to the figures, wherein:

FIG. 1 illustrates an embodiment where authenticated distance measurement is being used for content protection. In the center of the circle 101 a computer 103 is placed.

Figure 1:
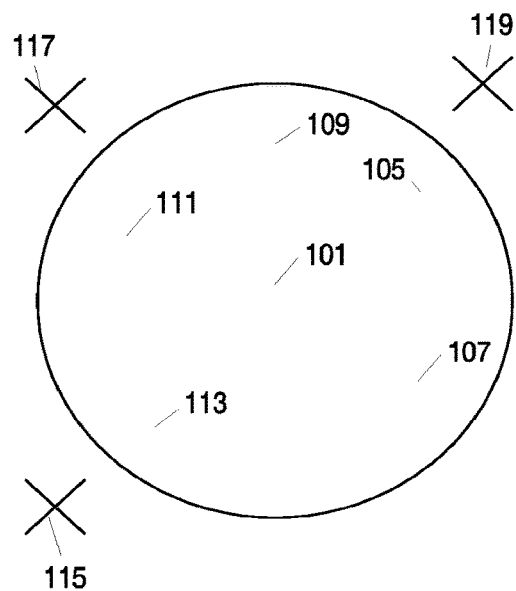
FIG. 1 illustrates authenticated distance measurement being used for content protection.

The computer comprises content, such as multimedia content being video or audio, stored on e.g. a hard disk, DVD or a CD. The owner of the computer owns the content and therefore the computer is authorized to access and present the multimedia content for the user. When the user wants to make a legal copy of the content to another device via e.g. a SAC, the distance between the other device and the computer 103 is measured and only devices within a predefined distance illustrated by the devices 105, 107, 109, 111, 113 inside the circle 101 are allowed to receive the content. Whereas the devices 115, 117, 119 having a distance to the computer 101 being larger than the predefined distance are not allowed to receive the content.

In the example a device is a computer, but it could e.g. also be a DVD drive, a CD drive or a Video, as long as the device comprises a communication device for performing the distance measurement.

In a specific example the distance might not have to be measured between the computer, on which the data are stored, and the other device, it could also be a third device e.g. a device being personal to the owner of the content which is within the predefined distance.

Figure 2:
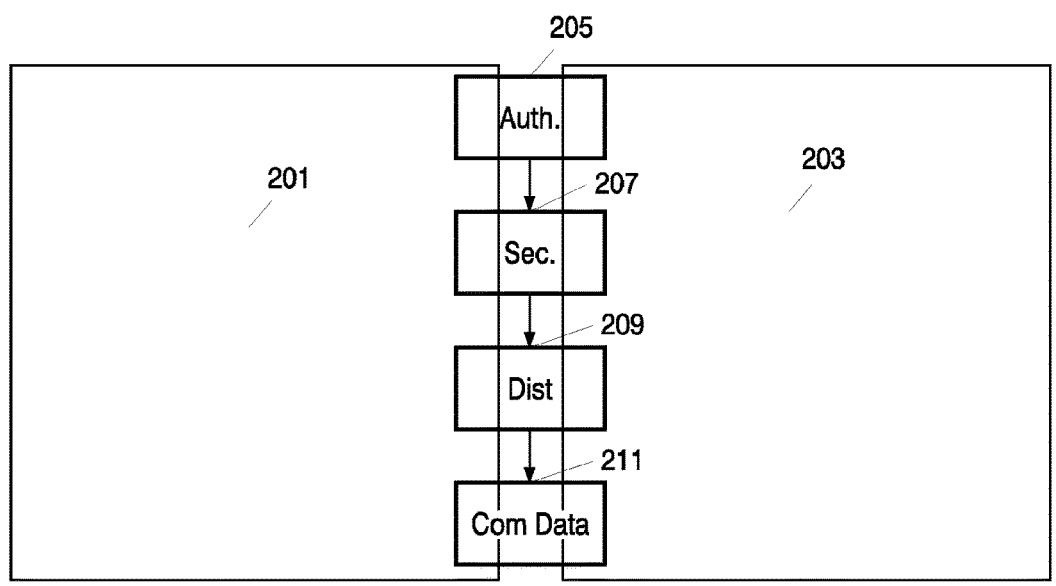
FIG. 2 is a flow diagram illustrating the method of performing authenticated distance measurement.

In FIG. 2 a flow diagram illustrates the general idea of performing authenticated distance measurement between two devices, 201 and 203 each comprising communication devices for performing the authenticated distance measurement. In the example the first device 201 comprises content which the second device 203 has requested. The authenticated distance measurement then is as follows. In step 205 the first device 201 authenticates the second device 203; this could comprise the steps of checking whether the second device 203 is a compliant device and might also comprise the step of checking whether the second device 203 really is the device identified to the first device 201. Then in step 207, the first device 201 exchanges a secret with the second device 203, which e.g. could be performed by transmitting a random generated bit word to second device 203. The secret should be shared securely, e.g. according to some key management protocol as described in e.g. ISO 11770.

Then in step 209, a signal for distance measurement is transmitted to the second device 203; the second device modifies the received signal according to the secret and retransmits the modified signal back to the first device. The first device 201 measures the round trip time between the signal leaving and the signal returning and checks if the returned signal was modified according to the exchanged secret. The modification of the returned signal according to some secret will most likely be dependent on the transmission system and the signal used for distance measurement, i.e. it will be specific for each communication system (such as 1394, Ethernet, Bluetooth, IEEE 802.11, etc.).

The signal used for the distance measurement may be a normal data bit signal, but also special signals other than for data communication may be used. In an embodiment spread spectrum signals are used to be able to get high resolution and to be able to cope with bad transmission conditions (e.g. wireless environments with a lot of reflections).

In a specific example a direct sequence spread spectrum signal is used for distance measurement; this signal could be modified by XORing the chips (e.g. spreading code consisting of 127 chips) of the direct sequence code by the bits of the secret (e.g. secret consists also of 127 bits). Also, other mathematical operations as XOR could be used.

The authentication 205 and exchange of secret 207 could be performed using the protocols described in some known ISO standards ISO 9798 and ISO 11770. For example the first device 201 could authenticate the second device 203 according to the following communication scenario:

First device->Second device: $R_B$||Text 1
where $R_B$ is a random number
Second device->First device: CertA||TokenAB
Where CertA is a certificate of A
TokenAB=$R_A$||$R_B$||B||Text3||$sS_A$($R_A$||$R_B$||B||Text2)
$R_A$ is a random number
Indentifier B is an option
$sS_A$ is a signature set by A using private key $S_A$ If TokenAB is replaced with the token as specified in ISO 11770-3 we at the same time can do secret key exchange. We can use this by substituting Text2 by:
Text2:=$eP_B$(A||K||||Text2)||Text3
Where ePB is encrypted with Public key B
A is identifier of A
K is a secret to be exchanged In this case the second device 203 determines the key (i.e. has key control), this is also called a key transport protocol, but also a key agreement protocol could be used. This may be undesirable in which case it can be reversed, such that the first device determines the key. A secret key has now been exchanged according to step 207 in FIG. 2. Again, the secret key could be exchanged by e.g. a key transport protocol or a key agreement protocol.

After the distance has been measured in a secure authenticated way as described above content, data can be sent between the first and the second device in step 211 in FIG. 2.

Figure 3:
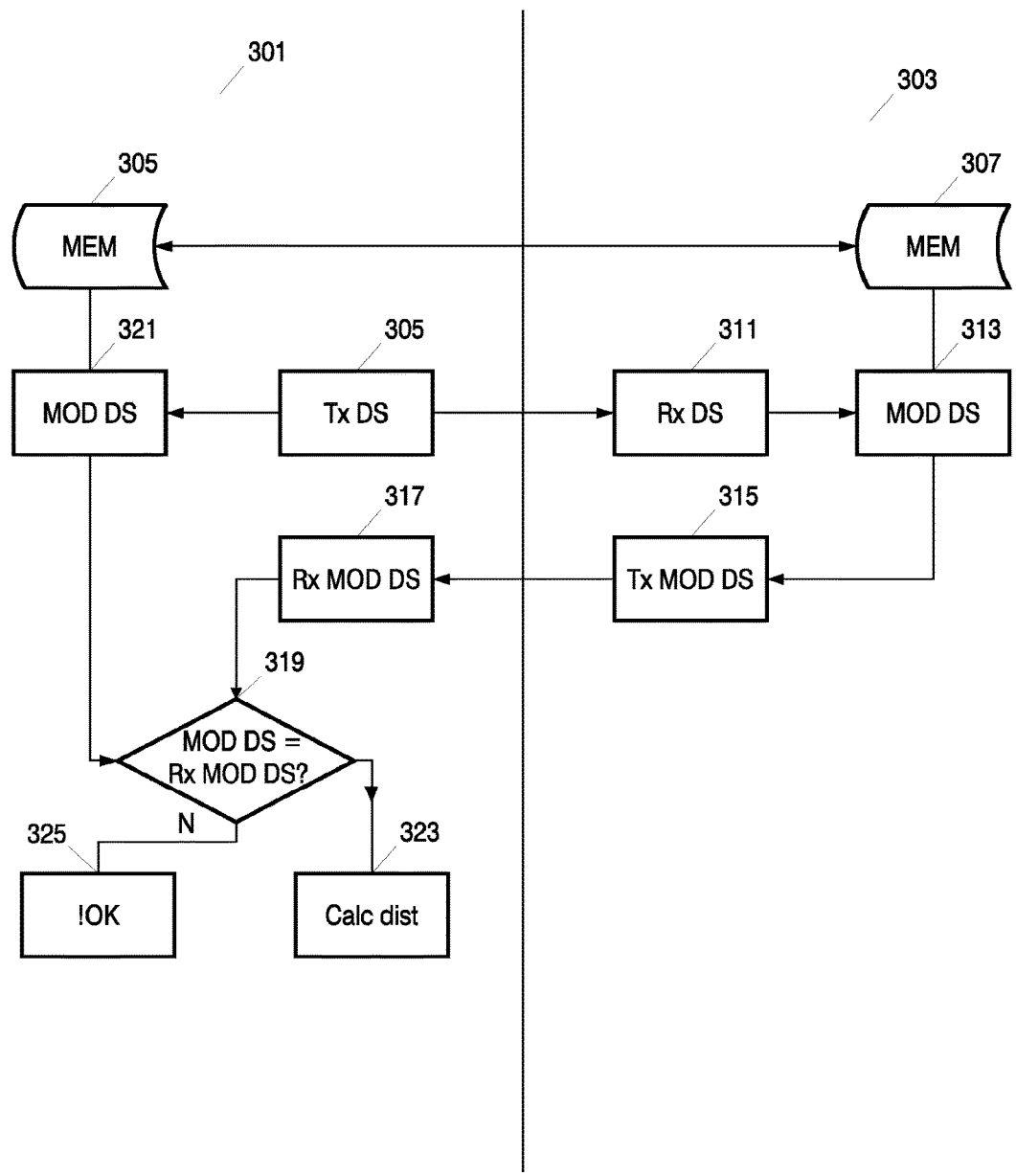
FIG. 3 illustrates in further detail the step of performing the authenticated distance measurement shown in FIG. 2.

FIG. 3 illustrates in further detail the step of performing the authenticated distance measurement. As described above the first device 301 and the second device 303 have exchanged a secret; the secret is stored in the memory 305 of the first device and the memory 307 of the second device. In order to perform the distance measurement, a signal is transmitted to the second device via a transmitter 309. The second device receives the signal via a receiver 311 and 313 modifies the signal by using the locally stored secret. The signal is modified according to rules known by the first device 301 and transmitted back to the first device 301 via a transmitter 315. The first device 301 receives the modified signal via a receiver 317 and in 319 the received modified signal is compared to a signal, which has been modified locally. The local modification is performed in 321 by using the signal transmitted to the second device in transmitter 309 and then modifying the signal using the locally stored secret similar to the modification rules used by the second device. If the received modified signal and the locally modified signal are identical, then the received signal is authenticated and can be used for determining the distance between the first and the second device. If the two signals are not identical, then the received signal cannot be authenticated and can therefore not be used for measuring the distance as illustrated by 325. In 323 the distance is calculated between the first and the second device; this could e.g. be performed by measuring the time, when the signal is transmitted by the transmitter 309 from the first device to the second device and measuring when the receiver 317 receives the signal from the second device. The time difference between transmittal time and receive time can then be used for determining the physical distance between the first device and the second device.

Figure 4:
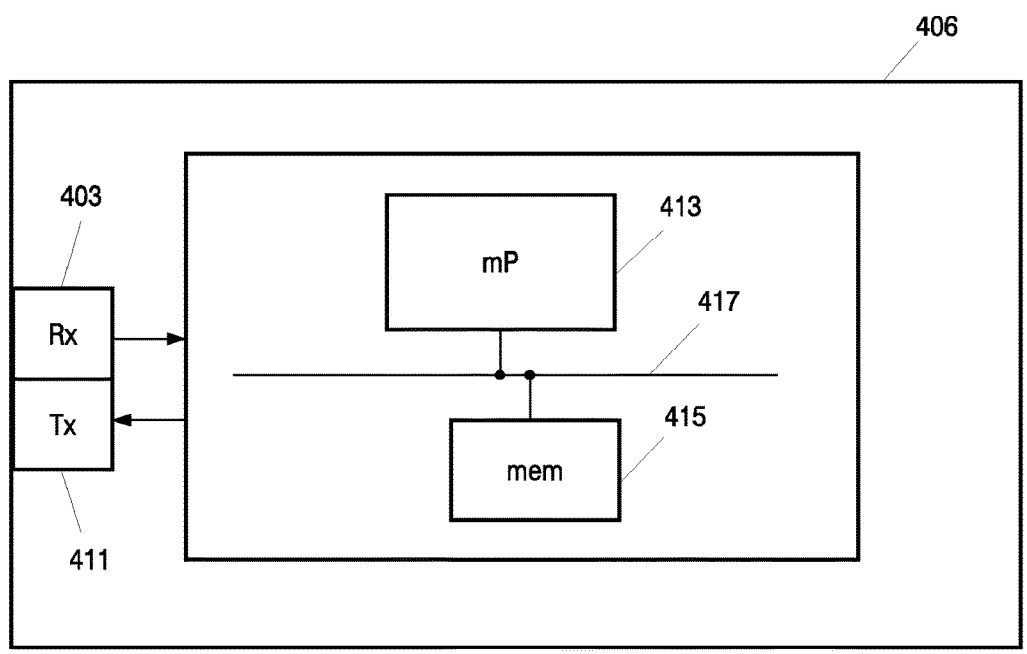
FIG. 4 illustrates a communication device for performing authenticated distance measurement.

In FIG. 4 a communication device for performing authenticated distance measurement is illustrated. The device 401 comprises a receiver 403 and a transmitter 411. The device further comprises means for performing the steps described above, which could be by executing software using a microprocessor 413 connected to memory 415 via a communication bus 417. The communication device could then be placed inside devices such as a DVD, a computer, a CD, a CD recorder, a television and other devices for accessing protected content.

What is claimed is:

1. A first device for controlling delivery of protected content to a second device, the first device comprising a processor circuit, the processor circuit arranged to execute instructions, the instructions arranged to:
   receive a second device certificate from the second device prior to sending a first signal;
   provide the first signal to the second device when the second device certificate indicates that the second device is compliant with at least one compliance rule;
   receive a second signal from the second device after providing the first signal; and
   provide the protected content to the second device when the second signal is derived from a secret and a time between the providing of the first signal and the receiving of the second signal is less than a predetermined time,
   wherein the secret is known by the first device.

2. The first device of claim 1, wherein the secret is securely provided to the second device by the first device.

3. The first device of claim 2, wherein determining that the second signal is derived from the secret comprises:
   modifying the first signal, wherein the modifying requires the secret; and
   determining that the modified first signal is identical to the second signal.

4. The first device of claim 3 wherein the secret comprises a first random number.

5. The first device of claim 4 wherein the secret is encrypted with a public key.

6. The first device of claim 5 wherein the first signal comprises a second random number.

7. The first device of claim 2, wherein the second signal comprises the first signal modified by the secret.

8. The first device of claim 2, wherein determining that the second signal is derived from the secret comprises:
   modifying the second signal, wherein the modifying requires the secret; and
   determining that the modified second signal is identical to the first signal.

9. The first device of claim 1, wherein determining that the second signal is derived from the secret comprises:
   modifying the first signal, wherein the modifying requires the secret; and
   determining that the modified first signal is identical to the second signal.

10. The first device of claim 1, wherein the predetermined time is based on a communication system associated with the first device.

11. The first device of claim 1, further comprising instructions arranged to provide the secret to the second device.

12. The first device of claim 1, wherein the second signal comprises the first signal modified by the secret.

13. The first device of claim 1 wherein the secret comprises a random number.

14. The first device of claim 1 wherein the secret is encrypted with a public key.

15. The first device of claim 1 wherein the first signal comprises a random number.

16. The first device of claim 1, wherein the second signal comprises an XOR operation of the first signal with the secret.

17. The first device of claim 1, further comprising instructions arranged to receive the secret from the second device.

18. The first device of claim 1, wherein determining that the second signal is derived from the secret comprises:
   modifying the second signal, wherein the modifying requires the secret; and
   determining that the modified second signal is identical to the first signal.

19. A method of controlling delivery of protected content from a first device to a second device, the first device comprising a processor circuit the processor circuit arranged to execute instructions implementing the method, the method comprising:
   receiving a second device certificate from the second device prior to sending a first signal;
   providing the first signal to the second device when the second device certificate indicates that the second device is compliant with at least one compliance rule;
   receiving a second signal from the second device after providing the first signal;
   sending the protected content from the first device to the second device when the second signal is derived from the secret and a time between the providing of the first signal and the receiving of the second signal is less than a predetermined time,
   wherein the secret is known by the first device.

20. The method of claim 19, wherein the secret is securely provided to the second device by the first device.

21. The method of claim 20, wherein determining that the second signal is derived from the secret comprises:
   modifying the first signal according to the secret; and
   determining that the modified first signal is identical to the second signal.

22. The method of claim 21, wherein the secret comprises a first random number.

23. The method of claim 22, wherein the secret is encrypted with a public key.

24. The method of claim 23, wherein the first signal comprises a second random number.

25. The method of claim 20, wherein the second signal comprises the first signal modified by the secret.

26. The method of claim 20, wherein determining that the second signal is derived from the secret comprises:
   modifying the second signal according to the secret; and
   determining that the modified second signal is identical to the first signal.

27. The method of claim 19, wherein determining that the second signal is derived from the secret comprises:
   modifying the first signal according to the secret; and
   determining that the modified first signal is identical to the second signal.

28. The method of claim 19, wherein the predetermined time is based on a communication system associated with the first device.

29. The method of claim 19, further comprising providing the secret to the second device.

30. The method of claim 19, wherein the second signal comprises the first signal modified by the secret.

31. The method of claim 19, wherein the secret comprises a random number.

32. The method of claim 19, wherein the secret is encrypted with a public key.

33. The method of claim 19, wherein the first signal comprises a random number.

34. The method of claim 19, wherein the second signal comprises an XOR operation of the first signal with the secret.

35. The method of claim 19, further comprising instructions arranged to receive the secret from the second device.

36. The method of claim 19, wherein determining that the second signal is derived from the secret comprises:
   modifying the second signal according to the secret; and
   determining that the modified second signal is identical to the first signal.

\* \* \* \* \*